United States Patent
Burg (10) Patent No.: US 7,761,778 B2
(45) Date of Patent: Jul. 20, 2010

(54) METHOD FOR WRITING DATA BLOCKS ON A BLOCK ADDRESSABLE STORAGE MEDIUM USING DEFECT MANAGEMENT

(75) Inventor: David Burg, Redmond, WA (US)

(73) Assignee: Nero AG, Karlsbad (DE)

( * ) Notice: Subject to any disclaimer, the term of this patent is extended or adjusted under 35 U.S.C. 154(b) by 1103 days.

(21) Appl. No.: 11/382,895

(22) Filed: May 11, 2006

(65) Prior Publication Data

US 2007/0033451 A1 Feb. 8, 2007

Related U.S. Application Data

(63) Continuation of application No. PCT/EP2005/013363, filed on Dec. 13, 2005.

(30) Foreign Application Priority Data

Jan. 10, 2005 (EP) .................................. 05000325

(51) Int. Cl.
G06F 11/00 (2006.01)
G08C 25/00 (2006.01)
H03M 13/00 (2006.01)
H04L 1/00 (2006.01)

(52) U.S. Cl. .............................. 714/799; 714/7; 714/8; 369/47.14; 369/53.16

(58) Field of Classification Search ................ 714/799, 714/7, 8; 369/47.14, 53.16
See application file for complete search history.

(56) References Cited

U.S. PATENT DOCUMENTS

| 5,237,553 | A  | * | 8/1993 | Fukushima et al. | ...... 369/53.17 |
| 6,278,807 | B1 |   | 8/2001 | Ito et al. | |
| 6,327,674 | B1 | * | 12/2001 | Ito et al. | .................... 714/8 |
| 6,526,009 | B1 |   | 2/2003 | Van Gestel | |
| 2005/0163010 | A1 | * | 7/2005 | Sasaki | .................... 369/53.16 |

FOREIGN PATENT DOCUMENTS

WO     WO 01/31650 A     5/2001

OTHER PUBLICATIONS

Incits: Multimedia Commands—4. Nov. 17, 2004.
SFC Committee: Mt. Fuji Commands for Multimedia Devices—SFF8090i. Sep. 29, 2004.
Padus: DiscJuggle User's Guide. www.padus.com. Jan. 15, 2002.

* cited by examiner

*Primary Examiner*—Sam Rizk
(74) *Attorney, Agent, or Firm*—Michael A. Glenn; Glenn Patent Group (57) ABSTRACT

The present invention relates to a method for writing data blocks on a block addressable storage medium, preferably an optical storage medium, using defect management. The invention also relates to the apparatus for writing data blocks on a block addressable storage medium, preferably an optical storage medium, using defect management, with a host unit and a target unit.

23 Claims, 2 Drawing Sheets

METHOD FOR WRITING DATA BLOCKS ON A BLOCK ADDRESSABLE STORAGE MEDIUM USING DEFECT MANAGEMENT

CROSS-REFERENCE TO RELATED APPLICATION

This application is a continuation of copending International Application No. PCT/EP2005/013363, filed Dec. 13, 2005, which designated the United States, and was not published in English and is incorporated herein by reference in its entirety.

BACKGROUND OF THE INVENTION

1. Field of the Invention

The present invention relates to a method for writing data blocks on a block addressable storage medium, preferably an optical storage medium, using defect management. The invention also relates to a computer program, a computer program product and an apparatus for writing data blocks on a block addressable storage medium.

2. Description of Prior Art

Rewritable recording media such as magneto-optical discs, phase-change discs (DVD-RAM, etc.), hard discs and the like may have defects on their recording surfaces. The defects may be the result of e.g. an initial failure caused during the time of shipment of the recording media from the factories to the customers, a flaw or blemish arising during the storage or usage of the recording media, or any deterioration caused by the usage of the recording media.

The existence of such a defect on the recording surface of the recording medium may cause a failure in the secure data recording. In view of this, in the art of rewritable recording media, a technique of detecting a defect on the recording surface face of a recording medium and recording the data at a position different from the position of the defect has been employed. Such a technique is generally referred to as "defect management".

Specifically, once the disc drive received an instruction to record the data into a data area on the recording surface of the recording medium from the host processor (e.g. a main controller/processor of a DVD-recorder), the disc drive first records the data into the specified sector in the data area. If it is determined that the sector is in the defective condition due to a defect on the recording surface, the disc drive records the same data including the same contents of the just recorded data into a spare area on the recording surface of the recording medium. That is, the spare area is disposed on the recording surface of the recording medium at a location different from the data area, which is for the normal recording of the data. Hence, in case of a failure to properly record the data into a certain sector in the data area due to a defect on the recording surface, the data is recorded into the spare area. Thereby, even in the case of a defective area, a loss of the data may be avoided.

In the art there are different techniques to record data and to perform a defect management.

In the "host based defect management", the host is doing the defect management alone. It can record data at optimal sped, but then has to verify that the data has actually been written correctly (usually the verification is done through a read command and comparing the data returned to the read command to the data written, or through a verify MMC (multimedia commands specification from INCITS T10) command; To record data at optimal speed, the recording procedure needs to be performed uninterrupted, so the verification phase can occur only after the recording. The host then needs huge amount of memory (up to the media capacity) to ensure it can handle defects for all the data recorded. If the host wants to limit its memory usage to a reasonable amount, then the host has to interrupt writing by verification before all the data is written, and this apparently does not result in an optimal recording performance. Additionally, it is uneasy and time consuming for the host to find light defects (defects that are automatically recovered by the target through error correction code placed on the media) and to decide whether it has to move data from the area having this light defect to a spare area or not. Finally, the file system used must be capable of handling defect management, like the UDF 1.50 file system, and this limits the choice of file system (the FAT file system does not support defect management).

In the "target-based defect management", the target is doing the defect management alone ("target" normally specifies the controller receiving multimedia commands from the host and directly driving the disc drive to read and write data from/to the storage medium). If the target chooses to perform a verification procedure after a write procedure (called: write by verification) to find a defect area or spot, because the target has access to limited memory, the target has to interrupt the write by verification procedure often, before the written data is out of its size limited memory. The target can also perform a certification of the media or a part of the media to find defective spots before writing to the media. However, the target is not granted to have time to certify the entire medium before the writing procedure caused by the host begins, and the certification information cannot be guaranteed valid once the media is ejected from the target (user could put his fingers on the media for instance, causing new defective spots, or could clean the media, potentially repairing previous defective spots). Additionally, if a defect is found (by verification) or known by the target (by certification) but written by the host, the device is unable to grant any streaming, because the data needs to be moved immediately to spare area, with the possibility that the spare area itself is defective, meaning that there is a possible recursion.

In the art, also a "host and target based defect management" exists. It is named "logical unit assisted software defect management model (persistent-DM and DRT-DM) and it is described in the MMC specification and the Mt Fuji (Mt Fuji commands for multimedia devices from SFF committee; ftp://ftp.avcpioneer.com/Mtfuji5/Spec/Fuji5rl6.zip) specification. However, this defect management technique requires that the host is maintaining the defect management information (performs "management" as defined in the mentioned model), increasing the complexity of the host implementation, and limiting the choice of file system. This technique also requires relative complex information to be transmitted between host and target to describe the defective spots. Finally, this technique does not allow the host to compute the image of the data it has to burn "at once", because the host has to recomputed and possibly change the file System information after it retrieved from the host the defective spots information.

The above-mentioned solutions for defect management suffer from the fact that they are not able to ideally perform both defect management and optimal recording performance.

This is true primarily for optical recording technology since it suffers both from frequent media defect and from additional seeking time which occurs during defect management.

SUMMARY OF THE INVENTION

In view of the above it is an object of the present invention to provide an apparatus and a method for writing data blocks on a block addressable storage medium using defect management, which allow data recording with optimal performance and which allow to limit or reduce complexity on the host side. A further object of the present invention is to avoid the requirement of changing the file system information after a defect is detected.

In accordance with a first aspect, the invention provides a method for writing data blocks on a block addressable storage medium, using defect management, the method including the steps of:
processing data to data blocks adapted to the storage medium by a host device;
sending each data block from the host device to a target device;
detecting suspicious areas, on the storage medium before writing data on the storage medium;
writing each data block addressed to a non-suspicious area to the storage medium by said target device without performing a defect management, so that writing of data to a spare area of the storage medium is not performed;
sending an information signal by the target device to the host device if a data block to be written is destined for a suspicious area of the storage medium, the information signal instructing the host device that the respective data block could not be written;
temporarily storing the respective data block by said host device in response to said information signal; and
after all data blocks have been sent to the target device, sending all temporarily stored data blocks from said host device to said target device and performing defect management by said target device upon writing said data blocks to the storage medium, the defect management including the following steps:
writing a data block to an initially dedicated suspicious area;
checking, whether the suspicious area is defective or not, and
when the suspicious area is defective, writing the data block into the spare area.

In accordance with a second aspect, the invention provides a method for controlling a target device of an optical storage medium recorder apparatus as to store data on the storage medium, wherein the target device is adapted to write data blocks on a block addressable storage medium using defect management, the method including the steps of:
processing data to data blocks adapted to the storage medium;
sending each data block from the host device to said target device together with the command not to perform a defect management, so that writing of data to a spare area of the storage medium is not performed by the target device;
temporarily storing the respective data block by said host device if an information signal from the target device is received signalling that said data block to be written by the target device is destined for a suspicious area of the storage medium, the information signal instructing the host device that the respective data block could not be written, the suspicious areas on the storage medium having been detected before writing data on the storage medium; and
after all data blocks have been sent to the target device, sending all temporarily stored data blocks to said target device together with the command to perform defect management upon writing said data blocks to the storage medium, the command causing the target device to perform the defect management including the following steps:
writing a data block to an initially dedicated suspicious area;
checking, whether the suspicious area is defective or not, and
when the suspicious area is defective, writing the data block into the spare area.

In accordance with a third aspect, the invention provides an apparatus for writing data blocks on a block addressable storage medium, preferably an optical storage medium, using defect management, with a host and a target, wherein
the host has
a processing element adapted to process data to data blocks adapted to the storage medium;
a transmitting element adapted to send each data block to said target; and
a storage element adapted to temporarily store a data block in response to an information signal sent by said target; and
the target has
a defect management element adapted to perform a defect management
a writing element adapted to write each data block addressed to a non-suspicious area to the storage medium without performing a defect management, so that writing of data to a spare area of the storage medium is not performed;
a sending element adapted to send the information signal to the host device if a data block to be written is destined for a suspicious area of the storage medium, the information signal instructing the host device that the respective data block could not be written, and the suspicious areas on the storage medium having been detected before writing data on the storage medium; and
a writing element adapted to write data blocks to the storage medium with performing a defect management, the defect management including the following steps:
writing a data block to an initially dedicated suspicious area;
checking, whether the suspicious area is defective or not, and
when the suspicious area is defective, writing the data block into the spare area.

In accordance with a fourth aspect, the invention provides an apparatus for controlling a target device of an optical storage medium recorder apparatus as to store data on the storage medium, wherein the target device is adapted to write data blocks on a block addressable storage medium using defect management, having:
a processor for processing data to data blocks adapted to the storage medium;
a sender for sending each data block from the host device to said target device together with the command not to perform a defect management, so that writing of data to a spare area of the storage medium is not performed by the target device;

a storage for temporarily storing the respective data block by said host device if an information signal from the target device is received signalling that said data block to be written by the target device is destined for a suspicious area of the storage medium, the information signal instructing the host device that the respective data block could not be written, the suspicious areas on the storage medium having been detected before writing data on the storage medium; and wherein the sender is further operative, after all data blocks have been sent to the target device, to send all temporarily stored data blocks to said target device together with the command to perform defect management upon writing said data blocks to the storage medium, the command being such that the target device, when receiving the command, is caused to perform the defect management including the following steps:

writing a data block to an initially dedicated suspicious area;

checking, whether the suspicious area is defective or not, and when the suspicious area is defective, writing the data block into the spare area.

In accordance with a fifth aspect, the invention provides a target device method for writing data blocks on a block addressable storage medium, using defect management, the method including the steps of:

receiving data blocks adapted to the storage medium from a host device;

detecting suspicious areas on the storage medium before writing data on the storage medium;

writing each data block addressed to a non-suspicious area to the storage medium without performing a defect management, so that writing of data to a spare area of the storage medium is not performed;

sending an information signal to the host device if a data block to be written is destined for a suspicious area of the storage medium, the information signal instructing the host device that the respective data block could not be written; and after all data blocks have been received, receiving all temporarily stored data blocks from said host device which have been temporarily stored in response to the information signal and performing defect management upon writing said data blocks to the storage medium, the defect management including the following steps:

writing a data block to an initially dedicated suspicious area;

checking, whether the suspicious area is defective or not, and when the suspicious area is defective, writing the data block into the spare area.

In accordance with a sixth aspect, the invention provides a target device for writing data blocks on a block addressable storage medium, using defect management, having the steps:

a receiver for receiving data blocks adapted to the storage medium from a host device;

a detector for detecting suspicious areas on the storage medium before writing data on the storage medium;

a writer for writing each data block addressed to a non-suspicious area to the storage medium without performing a defect management, so that writing of data to a spare area of the storage medium is not performed;

a sender for sending an information signal to the host device if a data block to be written is destined for a suspicious area of the storage medium, the information signal instructing the host device that the respective data block could not be written;

wherein the receiver is operative, after all data blocks have been received, to receive all temporarily stored data blocks from said host device which have been temporarily stored in response to the information signal; and a defect manager for performing defect management upon writing said data blocks to the storage medium, the defect management including the following steps:

writing a data block to an initially dedicated suspicious area;

checking, whether the suspicious area is defective or not, and when the suspicious area is defective, writing the data block into the spare area.

In accordance with a seventh aspect, the invention provides a computer program having a computer program code which, when executed on a data processing system, enables the data processing system to carry out the method for writing data blocks on a block addressable storage medium, using defect management, the method including the steps of:

processing data to data blocks adapted to the storage medium by a host device;

sending each data block from the host device to a target device;

detecting suspicious areas on the storage medium before writing data on the storage medium;

writing each data block addressed to a non-suspicious area to the storage medium by said target device without performing a defect management, so that writing of data to a spare area of the storage medium is not performed;

sending an information signal by the target device to the host device if a data block to be written is destined for a suspicious area of the storage medium, the information signal instructing the host device that the respective data block could not be written;

temporarily storing the respective data block by said host device in response to said information signal; and after all data blocks have been sent to the target device, sending all temporarily stored data blocks from said host device to said target device and performing defect management by said target device upon writing said data blocks to the storage medium, the defect management including the following steps:

writing a data block to an initially dedicated suspicious area;

checking, whether the suspicious area is defective or not, and when the suspicious area is defective, writing the data block into the spare area.

In accordance with an eighth aspect, the invention provides a computer program having a computer program code which, when executed on a data processing system, enables the data processing system to carry out the target device method for writing data blocks on a block addressable storage medium, using defect management, the target device method including the steps of:

receiving data blocks adapted to the storage medium from a host device;

detecting suspicious areas on the storage medium before writing data on the storage medium;

writing each data block addressed to a non-suspicious area to the storage medium without performing a defect management, so that writing of data to a spare area of the storage medium is not performed;

sending an information signal to the host device if a data block to be written is destined for a suspicious area of the storage medium, the information signal instructing the host device that the respective data block could not be written; and after all data blocks have been received, receiving all temporarily stored data blocks from said host device which have been temporarily stored in response to the information signal and performing defect management upon writing said data blocks to the storage medium, the defect management including the following steps:
 writing a data block to an initially dedicated suspicious area;
 checking, whether the suspicious area is defective or not, and
 when the suspicious area is defective, writing the data block into the spare area.

Briefly, the nucleus of this inventive approach is to perform a data recording/writing on the storage medium at high performance and without defect management (meaning that no data blocks are stored in spare areas) first, and second to resend those data blocks to the target which have been indicated by the target as data blocks addressed to defective spots in the first run. During the resending of data blocks, the target performs defect management and hence writes data blocks to the spare area if necessary.

The inventive approach allows to record at optimal performance as the initial writing is not interrupted by defect management replacement. It allows to have both streaming and defect management. The approach also allows using the large memory, which the host has access to, to temporarily store data that has to be written to spare area (or has to be verified first before deciding to write at the suspicious spot or spare area). The inventive approach allows keeping the defect management Information to the target level, so the host does not have to access the spare area directly, and can choose a file system without embedded defect management. The invention allows the target to take decision when data has to be moved to spare area. It also allows changing media between multiple hosts, including hosts which implements this technique and hosts which does not, as the defect management information is kept in the media and read only by the target. The invention allows the host to compute the image of the data it has to record (at once) because the data for rewriting stay identical at a logical point of view (the information of defective block mapping to spare area, usually kept in a sparing table, is maintained by the target).

In a preferred embodiment, the storage medium is a blu-ray storage medium.

Due to the huge amount of storage capacity the new blu-ray storage medium (DVD) offers, the limitation of memory necessary for storing data at the host is of particular importance. Therefore, the inventive approach is advantageous in connection with the new blu-ray standard.

In a preferred embodiment, said step of processing data comprises the step of forming the data to be stored into an image in which each data block is assigned a logical block address.

Preferably, the assigned logical address is sent together with the data block to the target device. More preferably, the target device assigns each logical block address a physical block address of the storage medium where the respective data block is to be stored.

With other words, the host has the task to assign each data block to be written on the medium a logical block address. This data pair is then sent to the target which in turn maps the logical block address to a physical block or sector address.

The advantage is that the host has not to change any logical block address assignment due to defect management even during the resending step. The defect management meaning the remapping of block addresses to spare area of the medium is solely performed by the target, and is stored on the medium.

In a further preferred embodiment the step of writing each data block comprises the step of certifying whether the area corresponding to the physical block address of the data block is defect or not before writing said data block.

In this context, certifying means that it is first checked whether the storing area is a defective area or not.

In an alternative embodiment, the step of writing each data block comprises the step of verifying whether the area corresponding to the physical block address of the data block is defect or not.

In this context, verifying means that the data is written to the area of the medium, then read back and compared with original data. If a difference of these data is detected, the area is defect.

In a preferred embodiment, said step of temporarily storing said data block comprises the step of also storing the logical address assigned to said data block together with said data block. Preferably, the step of sending the temporarily stored data blocks comprises the step of sending the respective logical address assigned to each data block together with a respective data block.

With other words the host temporarily stores the data blocks and the assigned logical block addresses in response to the information signal sent by the target device. The logical block addresses are the same as those assigned during the step of processing data blocks adapted to the storage medium. Hence, the host has to calculate and sign logical block addresses to data blocks only once; no remapping etc. of logical block addresses is necessary.

In a further preferred embodiment, the step of performing a defect management comprises the step of writing the received data block to a spare area of the storage medium by the get device if the storage medium area corresponding to the logical address of the received data block is still defect.

Preferably, the logical address of the received data block and the physical address of the spare area the data block has been written to is stored in a mapping table stored in the storage medium, preferably in the spare area.

In a further preferred embodiment, the step of writing each data block to the storage medium by said target device is performed with high rate, whereas the step of writing said temporarily stored data blocks to the storage medium is performed with a lower rate.

In this context, high rate means that a recording rate is used which would not be possible if defect management is performed. Lower rate means that the rate is selected such that defect management is possible.

The object of the present invention is also solved by a method for controlling a target device of an optical storage medium recorder apparatus as to store data on the storage medium, wherein the target devices adapted to write data blocks on a block addressable storage medium using defect management, the method comprising the step: Processing data to data blocks adapted to the storage medium; sending each data block from the host device to said target device together with the demand not to perform a defect management; temporarily storing the respective data block by said host device if an information signal from the target device is received signalling that said data block is destined for a defect area of the storage medium; and after all data blocks have been sent to the target device, sending all temporarily stored data blocks to said target device together with the command to perform defect management upon writing said data blocks to the storage medium.

This method describes those steps performed by the host soley.

This inventive method has the same advantages as the aforementioned inventive method. It is therefore referred to the respective description above.

The present invention also relates to a computer program comprising computer program code which, when executed on a data processing system, enables the data processing system to carry out any of the methods described above. It also relates to a computer program product comprising computer program code, which, when executed on a data processing system, enables the data processing system to carry out the method as described above.

The object of the present invention is also solved by an apparatus for writing data blocks on a block addressable storage medium, preferably an optical storage medium, using defect management, with a host unit, and a target unit, wherein the host unit comprises a processing element adapted to process data to data blocks adapted to the storage medium, a transmitting element adapted to send each data block to said target unit, and a storing element adapted to temporarily store a data block in response to an information signal sent by said target unit; and the target unit comprises a defect management element adapted to perform a defect management, a writing element adapted to write each data block to the storage medium without performing a defect management, a sending element adapted to send an information signal to the host device if a data block is destined for a defect area of the storage medium, and a writing element adapted to write data blocks to the storage medium with performing a defect management.

This inventive apparatus achieves the same advantages as described in accordance with the method. Therefore it may be referred to the respective description above. It is to be noted that the processing element, the transmitting element and the storing element may be incorporated in a single unit, e.g. a processor. Also, the defect management element, the writing element, the sending element and the writing element may be incorporated in a single controller unit.

In a preferred embodiment, said defect management element is adapted to be switched between a defect management status and a non-defect management status in response to a signal sent by the host unit.

In other words, the target unit is able to write data on the storage medium without performing a defect management (meaning: reduced defect management since the defect management element performs a detection of defective spots or areas during writing but does not perform writing of data to spare areas) if the defect management element is in the non-defect management status.

Further features and advantages can be taken from the following description and the enclosed drawings.

It is to be understood that the features as mentioned above and those yet to be explained below can be used not only in the respective combinations indicated, but also in other combinations or in isolation, without leaving the scope of the present invention.

BRIEF DESCRIPTION OF THE DRAWINGS

These and other objects and features of the present invention will become clear from the following description taken in conjunction with the accompanying drawing, in which.

DESCRIPTION OF PREFERRED EMBODIMENTS

In the following, the present invention is described on the basis of DVD-recorder. However, it is to be noted that the invention is not limited thereto meaning that the inventive method may also be used for any kind of optical storage medium, electro-optical medium or electromagnetic medium. However, the method is of particular interest with regard to the new blu-ray DVD media. Due to the huge amount of storage the performance issue plays an important role.

Further, it is referred to the multimedia commands specification from INCITS T10 and the Mt Fuji commands for multimedia devices from SFF committee, both specifications being incorporated by reference herewith. In particular, both specifications contain detailed description about the functional corporation between the target device and the host device and the structure of the commands to be used.

Figure 1:
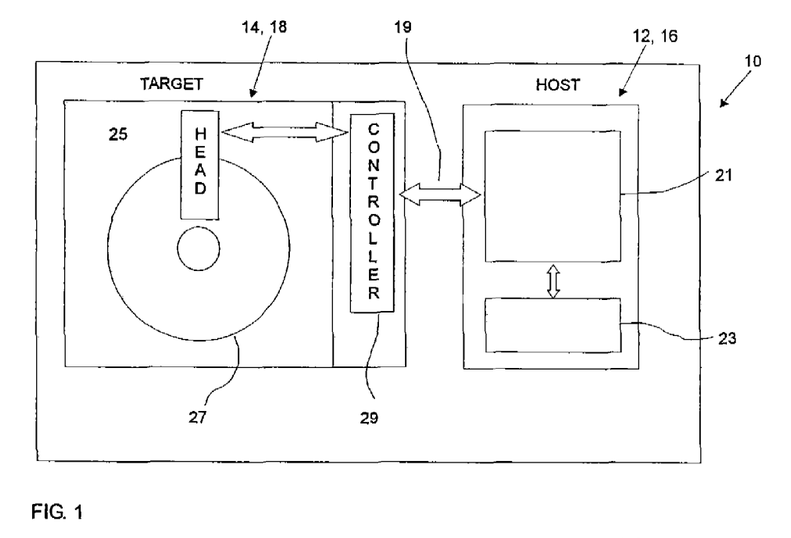
FIG. 1 is a schematic diagram of a DVD-recorder.

Referring to FIG. 1, a DVD-recorder is schematically shown and indicated with reference numeral 10. The DVD-recorder comprises two units, namely the host unit or device 12 and the target unit or device 14. The host device 12 may be provided for example as a personal computer 16. The target unit device 14 may be provided as a single DVD disc unit 18 communicating with the PC 16 via a standardized interface 19.

The host device 12 comprises a processor 21 and a memory element 23. The memory element 23 stores for example a program code which may be executed by the processor 21. The program code may for example implement a program for writing (burning) data on a DVD storage medium. Such programs are generally known and are for example offered by the applicant under the trademark "Nero".

The target device 14 comprises at least one head 25 for reading and writing data from and to, respectively, a DVD medium 27. The control of the head 25 and the read and write process is performed by a controller 29. The controller 29 is adapted to communicate with the host device 12 on the basis of a standardized protocol (e.g. MMC specification) and drives the head 25 in response to respective commands transmitted by the host device.

As already mentioned before, the processor 21 of the host device 12 runs a program for writing data selected by the user of the DVD-recorder to the DVD medium 27. The program therefor forms a so-called image out of the selected data. The image comprises the selected data grouped in data blocks and logical block addresses assigned to each data block. However, it is to be noted that this is not a detailed description how to generate an image but rather a description of those steps necessary for understanding the present invention.

After the image is formed, the program generates the respective commands which are transmitted to the controller of the target device 14 together with the data to be stored. The controller 29 receives these commands (according to the MMC specifications, e.g.) and the data, and drives the head 25 in response thereto to write the data on the DVD medium 27.

Since block addressable storage media, like the present DVD medium 27, may have defects on their surfaces that render some sectors either temporarily or permanently unusable, the controller 29 is adapted to implement a mechanism that provides an apparently defect free address space to the host device 12. As already mentioned before, this mechanism is named defect management. If, for example, a data block of the image is to be stored in a defect area or sector of the DVD medium 27, the controller detects this defect area and writes the data block in a different area, normally a spare area within a defect management area on the DVD medium 27. Further, the controller 29 ensures that a respective mapping information is also stored on the DVD within the defect management area. In this target-based defect management, the host device 12 is not involved in the remapping process. However, the host 12 have to wait until the defect management is terminated which takes more time than the normal writing process without defect management.

The present invention modifies this target-based defect management a little bit as to improve the overall performance of the DVD-recorder. This modification will now be described with reference to FIGS. 2 and 3.

Figure 2:
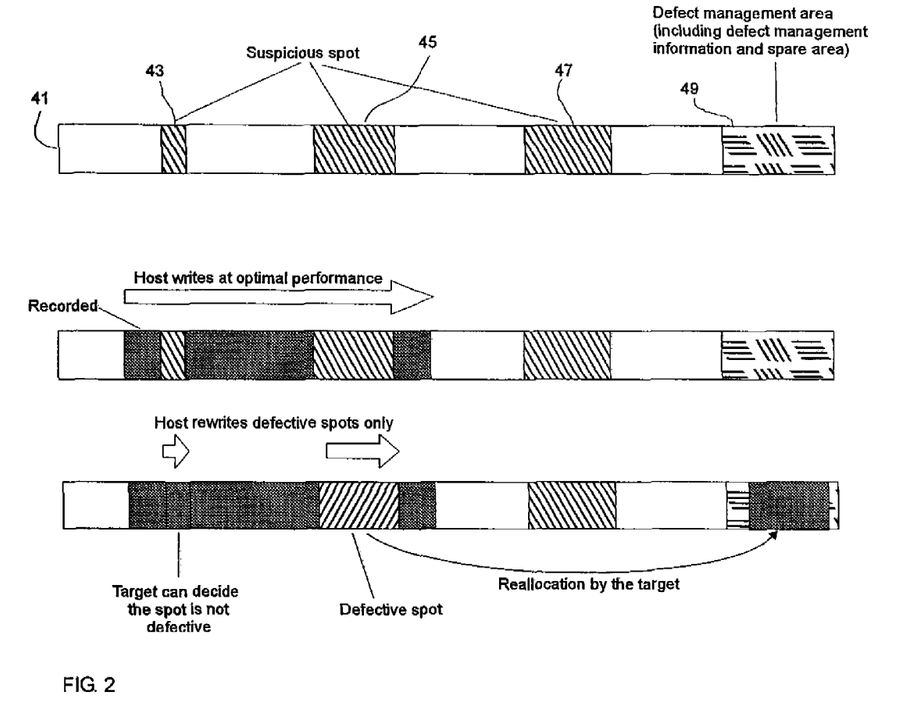
FIG. 2 shows schematic diagrams of rewritable area of the DVD medium.
Figure 3:
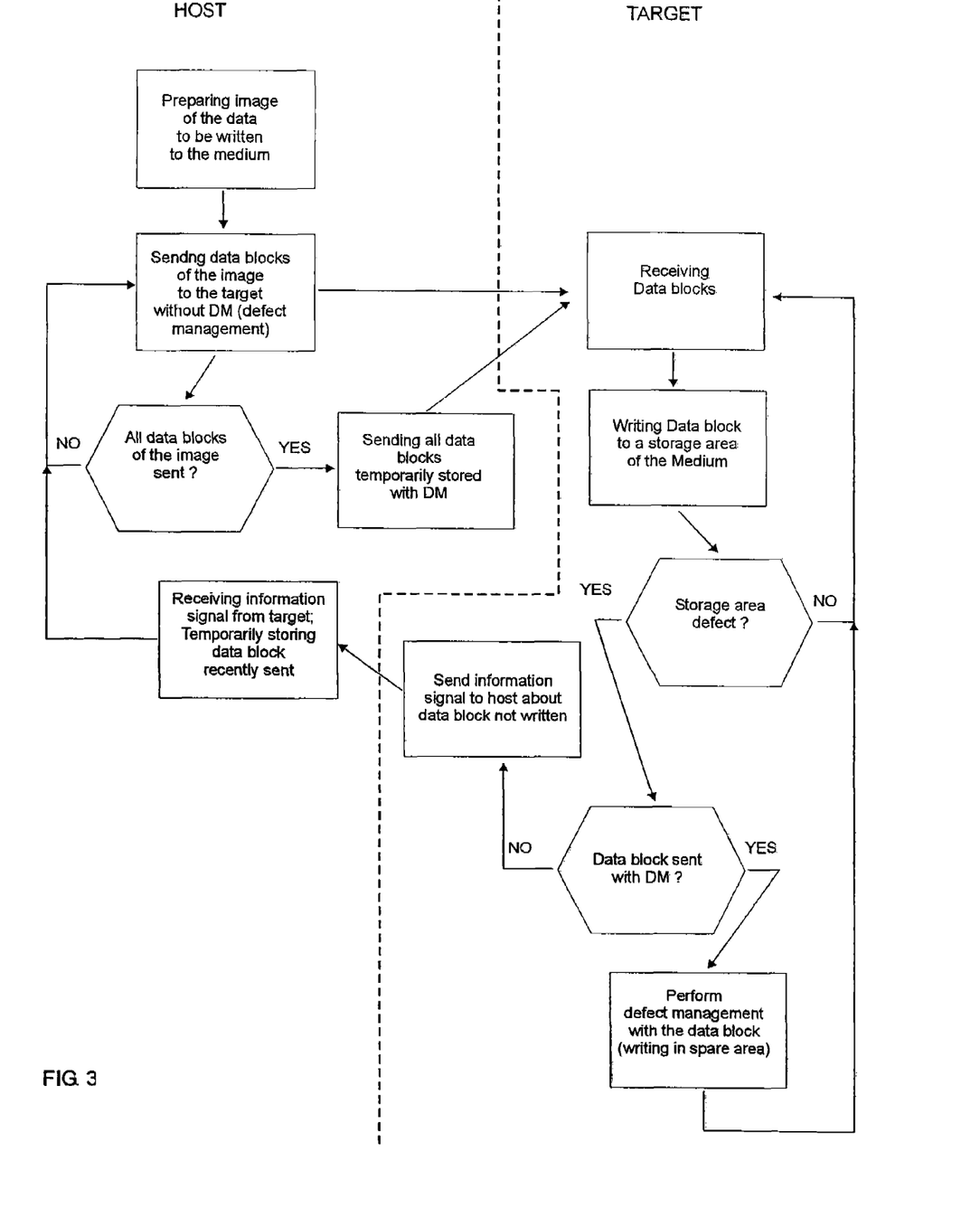
FIG. 3 is a flow diagram for describing the method according to the present invention.

The method of writing the data image on the DVD medium 27 may be divided in two stages.

In the first stage, the data is transmitted by the host device 12 and written by the target device 14 at optimal performance.

In order to reach the optimal performance, it is necessary that the controller does not perform the defect management as described above. This may be achieved, for example, by adding a new command to the MMC specification (or any other specification) instructing the controller not to perform defect management. However, other ways of instructing the controller not to perform defect management are conceivable.

However, although the defect management is deactivated, the controller checks whether the area where the data block has to be stored is defective. This check may be achieved by a certification process or a verification process, which are both commonly known. It is to be noted that this check may be performed before writing the data image or during the writing process.

In FIG. 2, an area of the DVD medium 27 for storing data is schematically shown in form of a track 41. For illustrative purposes, three suspicious spots or areas 43, 45 and 47 are shown within the track 41. These suspicious spots have, for example, been detected in a certification process before writing the data. It is also shown in FIG. 2, that the DVD medium 27 comprises a defect management area 49 provided for storing defect management information, and a spare area necessary for storing data blocks initially indicated for suspicious or defective spots.

During the process of writing data on the DVD medium 27 at optimal performance, the controller transmits a signal to the host device 12 via the interface 19 if the data block to be written is addressed to an area indicated as a suspicious spot 43-47. The controller generates and transmits this signal to the host device instructing it that the respective data block could not be written. Afterwards, the controller proceeds further with writing data blocks of the image at optimum performance.

The host 12 temporarily stores the data block which could not be written, in response to the signal sent by the controller 29. The data block may, for example, be stored in the memory element 23.

If all data blocks of the image have been sent to the controller 29 and written at optimum performance, the first stage is terminated and the second stage begins.

During the second stage, the data blocks which are temporarily stored in memory element 23 during the first stage, are sent again to the controller 29. However, in contrast to the first stage, the controller is now instructed to perform a defect management.

The controller writes each data block to the initial area (suspicious spot) and checks whether this suspicious area is defective or not. With reference to FIG. 2, last track diagram, the suspicious spot 43 has been recognized by the controller as not defective so that the data block can be stored there.

However, the check of the second suspicious spot 45 leads to the result that it is detective. Hence, the defect management reallocates an area within the defect management area for storing the respective data block(s). Simultaneously, this reallocation is indicated in a mapping table within the defect management area.

Due to the defect management, the process of rewriting the temporarily stored data blocks may not be performed with optimal performance but with a lower rate.

After all temporarily stored data blocks have been written to the DVD medium 27, the second stage is terminated. This also means that the whole process of writing the image to the DVD medium is done.

The flow chart in FIG. 3 shows again the respective steps described above.

It is apparent from the above description that the host device 12 is only slightly involved in the defect management. The host device 12 has only to store data blocks temporarily in response to a command sent by the controller 29. However, the host device 12 has not to perform any mapping or remapping procedure or any other procedure for allocating a spare area for data blocks to be written. Particularly, the host device 12 uses the same logical block addresses both, in the first stage and in the second stage.

The reallocation of the area on the DVD medium 27 for storing data blocks is solely done by the target device 14.

To briefly summarize, the present invention provides a new technique consisting of controlling the defect management activity of the target device by the host device, using the large amount of memory the host device has access to, so the recording can be proceeded at optimal performance and the defect management can still be done.

The host device first indicates to the target device that it wants to record at optimal performance and it does not want the host device to perform defect management replacement at this time. The indication could either be given per write, with a flag in the command descriptor, or set permanently through a parameter change, and unset at the end of the recording at optimal performance. The target shall, however, still collect information when a defective spot is reached by the recording and provide immediately the information to the host device, so the host keeps a copy of the data which has to be written on the logical address matching this defective spot.

It is up to the target to decide to perform either certification or verification after write or both, in order to find defective spots. It is to be noted that even if the target device decides to perform verification after write, for instance, if it could not perform certification before write, it can still grant a streaming throughput up to the value calculated as (size of the target data buffer, size divided by (write time at maximal speed for the target data buffer size plus verification time at maximal speed for the target data buffer size, plus time to change from right to verify back and forth)). The host device can allocate on the fly the exact memory capacity to store the data to be rewritten (it does not have to keep in memory the data successfully written).

When the writing at optimal performance has ended because the host has exhausted all the data it had to write, the host device indicates to the target that it wants to record with defect management performed by the device, including defect management replacement. Then the target device will write the copy of data which has to be written on the logical address matching to the defective spots found during the initial recording and optimal performance. The target performs at this time a writing of the data to the spare area and updates the defect management information on the DVD medium. It is to be noted that the host device did not compute again its file system information; it only had to write again the exact same data and the exact same logical addresses.

Optionally, the target can spend additional time during the rewrite phase to check if the defective spot needs to be reallocated to spare or not. So, it can signal suspicious spots during the writing at optimal performance and check its suspicion later.

This technique allows to record at optimal performance, as the initial writing is not interrupted by defect management replacement. The inventive technique allows to have both, streaming and defect management. This technique allows using the larger memory the host device has access to, to temporarily store data that has to be written to spare area (or has to be verified first before deciding to write at the suspicious spot or at the spare area). This technique also allows keeping the defect management information to the target level, so that the host does not have to access the spare area directly, and can choose a file system without embedded defect management.

Those skilled in the art can appreciate from the foregoing description that the broad teachings of the present invention can be implemented in a variety of forms. Therefore, while this invention has been described in connection with a particular example thereof, the true scope of the invention should not be so limited since other modifications will become apparent to the skilled practitioner upon a study of the drawings, specification and claims.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for controlling a target device in order to store data on the storage medium, wherein the target device is adapted to write data blocks on a block addressable storage medium using a defect management, comprising:

processing data to data blocks adapted to the storage medium;

sending each data block from the host device to said target device together with the command not to perform the defect management, so that writing of data to a spare area of the storage medium is not performed by the target device;

temporarily storing the respective data block by said host device if an information signal from the target device is received signalling that said data block to be written by the target device is destined for a suspicious area of the storage medium, the information signal instructing the host device that the respective data block could not be written, the suspicious areas on the storage medium having been detected before writing data on the storage medium; and after all data blocks have been sent to the target device, sending all temporarily stored data blocks to said target device together with the command to perform the defect management upon writing said data blocks to the storage medium, the command being such that the target device is caused, when receiving the command, to perform the defect management, the defect management including the following:

writing a data block to a detected suspicious area;

checking, whether the suspicious area is defective or not, and when the suspicious area is defective, writing the data block into the spare area.

2. The method of claim 1, in which the target device is a target device of an optical storage medium recorder apparatus.

3. The method of claim 1, in which the target device is controlled to write data blocks on the block addressable storage medium, using the defect management, additionally comprising:

before the step of temporarily storing:

detecting suspicious areas on the storage medium before writing data on the storage medium;

writing each data block addressed to a non-suspicious area to the storage medium by said target device without performing the defect management, so that writing of data to a spare area of the storage medium is not performed;

sending the information signal by the target device to the host device if a data block to be written is destined for a suspicious area of the storage medium, performing the defect management by said target device upon writing said data blocks to the storage medium, the defect management including the following:

writing a data block to a detected suspicious area;

checking, whether the suspicious area is defective or not, and when the suspicious area is defective, writing the data block into the spare area.

4. The method of claim 3, wherein said storage medium is a blu-ray storage medium.

5. The method of claim 3, wherein said step of processing data comprises the step of computing an image of the data to be stored, in which each data block is assigned a logical block address.

6. The method of claim 5, wherein the assigned logical address is sent together with the data block to the target device.

7. The method of claim 6, wherein said target device assigns each logical block address a physical block address of the storage medium where the respective data block is to be stored.

8. The method of claim 7, wherein the step of writing each data block comprises the step of checking whether the area corresponding to the physical block address of the data block is defect or not, before writing said data block.

9. The method of claim 7, wherein the step of writing each data block comprises the step of checking whether the area corresponding to the physical block address of the data block is defect or not, after writing said data block.

10. The method of claim 5, wherein said step of temporarily storing said data block comprises the step of also storing the logical address assigned to said data block together with said data block.

11. Method of claim 10, wherein the step of sending the temporarily stored data blocks comprises the step of sending the respective logical address assigned to each data block together with the respective data block.

12. The method of claim 11, wherein the step of performing the defect management comprises the step of writing the received data block to a spare area of the storage medium by the target device if the storage medium area corresponding to the logical address of the received data block is still defect.

13. The method of claim 12, wherein said logical address of the received data block and the physical address of the spare area the data block has been written to is stored in a mapping table stored in the storage medium, preferably in the spare area.

14. The method of claim 1, wherein said step of writing each data block to the storage medium by said target device is performed with high rate, whereas the step of writing said temporarily stored data blocks to the storage medium is performed with a lower rate.

15. An apparatus for writing data blocks on a block addressable storage medium, preferably an optical storage medium, using defect management, with a host unit and a target unit, wherein the host unit comprises
- a processing element adapted to process data to data blocks adapted to the storage medium;
- a transmitting element adapted to send each data block to said target unit; and
- a storage element adapted to temporarily store a data block in response to an information signal sent by said target unit; and the target unit comprises
- a defect management element adapted to perform a defect management
- a writing element adapted to write each data block addressed to a non-suspicious area to the storage medium without performing a defect management, so that writing of data to a spare area of the storage medium is not performed;
- a sending element adapted to send the information signal to the host device if a data block to be written is destined for a suspicious area of the storage medium, the information signal instructing the host device that the respective data block could not be written, and the suspicious areas on the storage medium having been detected before writing data on the storage medium; and
- a writing element adapted to write data blocks to the storage medium with performing a defect management, the defect management including the following:

writing a data block to an initially dedicated suspicious area;

checking, whether the suspicious area is defective or not, and when the suspicious area is defective, writing the data block into the spare area.

16. The apparatus of claim 15, wherein said defect management element is adapted to be switched between a defect management status and a non defect management status in response to a signal sent by the host unit.

17. An apparatus for controlling a target device of an optical storage medium recorder apparatus as to store data on the storage medium, wherein the target device is adapted to write data blocks on a block addressable storage medium using defect management, comprising:

- a processor for processing data to data blocks adapted to the storage medium;
- a sender for sending each data block from the host device to said target device together with the command not to perform a defect management, so that writing of data to a spare area of the storage medium is not performed by the target device;
- a storage for temporarily storing the respective data block by said host device if an information signal from the target device is received signalling that said data block to be written by the target device is destined for a suspicious area of the storage medium, the information signal instructing the host device that the respective data block could not be written, the suspicious areas on the storage medium having been detected before writing data on the storage medium; and
- wherein the sender is further operative, after all data blocks have been sent to the target device, to send all temporarily stored data blocks to said target device together with the command to perform defect management upon writing said data blocks to the storage medium, the command being such that the target device, when receiving the command, is caused to perform the defect management including the following:

writing a data block to an initially dedicated suspicious area;

checking, whether the suspicious area is defective or not, and when the suspicious area is defective, writing the data block into the spare area.

18. A target device method for writing data blocks on a block addressable storage medium, using defect management, comprising:

receiving data blocks adapted to the storage medium from a host device;

detecting suspicious areas on the storage medium before writing data on the storage medium;

writing each data block addressed to a non-suspicious area to the storage medium without performing a defect management, so that writing of data to a spare area of the storage medium is not performed;

sending an information signal to the host device if a data block to be written is destined for a suspicious area of the storage medium, the information signal instructing the host device that the respective data block could not be written; and after all data blocks have been received, receiving all temporarily stored data blocks from said host device which have been temporarily stored in response to the information signal and performing defect management upon writing said data blocks to the storage medium, the defect management including the following:

writing a data block to an initially dedicated suspicious area;

checking, whether the suspicious area is defective or not, and when the suspicious area is defective, writing the data block into the spare area.

19. A target device for writing data blocks on a block addressable storage medium, using defect management, comprising:
- a receiver for receiving data blocks adapted to the storage medium from a host device;
- a detector for detecting suspicious areas on the storage medium before writing data on the storage medium;
- a writer for writing each data block addressed to a non-suspicious area to the storage medium without performing a defect management, so that writing of data to a spare area of the storage medium is not performed;
- a sender for sending an information signal to the host device if a data block to be written is destined for a suspicious area of the storage medium, the information signal instructing the host device that the respective data block could not be written;
- wherein the receiver is operative, after all data blocks have been received, to receive all temporarily stored data blocks from said host device which have been temporarily stored in response to the information signal; and
- a defect manager for performing defect management upon writing said data blocks to the storage medium, the defect management including the following:
    - writing a data block to an initially dedicated suspicious area;
    - checking, whether the suspicious area is defective or not, and
    - when the suspicious area is defective, writing the data block into the spare area.

20. A computer program comprising a computer program code which, when executed on a data processing system, enables the data processing system to carry out the method for controlling a target device in order to store data on the storage medium, wherein the target device is adapted to write data blocks on a block addressable storage medium using a defect management, comprising:
- processing data to data blocks adapted to the storage medium;
- sending each data block from the host device to said target device together with the command not to perform the defect management, so that writing of data to a spare area of the storage medium is not performed by the target device;
- temporarily storing the respective data block by said host device if an information signal from the target device is received signalling that said data block to be written by the target device is destined for a suspicious area of the storage medium, the information signal instructing the host device that the respective data block could not be written, the suspicious areas on the storage medium having been detected before writing data on the storage medium; and
- after all data blocks have been sent to the target device, sending all temporarily stored data blocks to said target device together with the command to perform the defect management upon writing said data blocks to the storage medium, the command being such that the target device is caused, when receiving the command, to perform the defect management, the defect management including the following:
    - writing a data block to a detected suspicious area;
    - checking, whether the suspicious area is defective or not, and
    - when the suspicious area is defective, writing the data block into the spare area.

21. The computer program of claim 20, which is stored on a machine-readable carrier.

22. A computer program comprising a computer program code which, when executed on a data processing system, enables the data processing system to carry out the target device method for writing data blocks on a block addressable storage medium, using defect management, the method comprising:
- receiving data blocks adapted to the storage medium from a host device;
- detecting suspicious areas on the storage medium before writing data on the storage medium;
- writing each data block addressed to a non-suspicious area to the storage medium without performing a defect management, so that writing of data to a spare area of the storage medium is not performed;
- sending an information signal to the host device if a data block to be written is destined for a suspicious area of the storage medium, the information signal instructing the host device that the respective data block could not be written; and
- after all data blocks have been received, receiving all temporarily stored data blocks from said host device which have been temporarily stored in response to the information signal and performing defect management upon writing said data blocks to the storage medium, the defect management including the following:
    - writing a data block to an initially dedicated suspicious area;
    - checking, whether the suspicious area is defective or not, and
    - when the suspicious area is defective, writing the data block into the spare area.

23. The computer program of claim 22, which is stored on a machine-readable carrier.

* * * * *